3 Sheets—Sheet 1.

J. L. ALBERGER.

KETTLES FOR TRYING OIL.

No. 7,305. Reissued Sept. 12, 1876.

Witnesses:
Edw. W. Down
M. Gardner.

Inventor:
John L. Alberger
By Munn & Co
Attorneys

N. PETERS, PHOTO-LITHOGRAPHER, WASHINGTON, D. C.

3 Sheets—Sheet 2.

J. L. ALBERGER.

KETTLES FOR TRYING OIL.

No. 7,305.

Reissued Sept. 12, 1876.

Witnesses:
Edw. H. Jones
M Gardner.

Inventor:
John L. Alberger,
By Amos Broadnax
Attorney

N. PETERS, PHOTO-LITHOGRAPHER, WASHINGTON, D. C.

3 Sheets—Sheet 3.

J. L. ALBERGER.

KETTLES FOR TRYING OIL.

No. 7,305. Reissued Sept. 12, 1876.

Witnesses { Jno B Tippett
R W Leonellano

John L. Alberger
Inventor
By Amos Broadwell
Attorney

N. PETERS, PHOTO-LITHOGRAPHER, WASHINGTON, D. C.

UNITED STATES PATENT OFFICE.

JOHN L. ALBERGER, OF BUFFALO, NEW YORK.

IMPROVEMENT IN KETTLES FOR TRYING OILS.

Specification forming part of Letters Patent No. 22,152, dated November 30, 1858; extended seven years; reissue No. 7,305, dated September 12, 1876; application filed April 13, 1876.

*To all whom it may concern:*

Be it known that I, JOHN L. ALBERGER, of Buffalo, in the county of Erie and State of New York, have invented certain new and useful Improvements in Kettles or Boilers for Trying Oils, Fats, &c.; and I do hereby declare the following to be a full, clear, and exact description of the construction and operation of the same, reference being had to the accompanying drawing, making part of this specification, in which—

Figure 1:
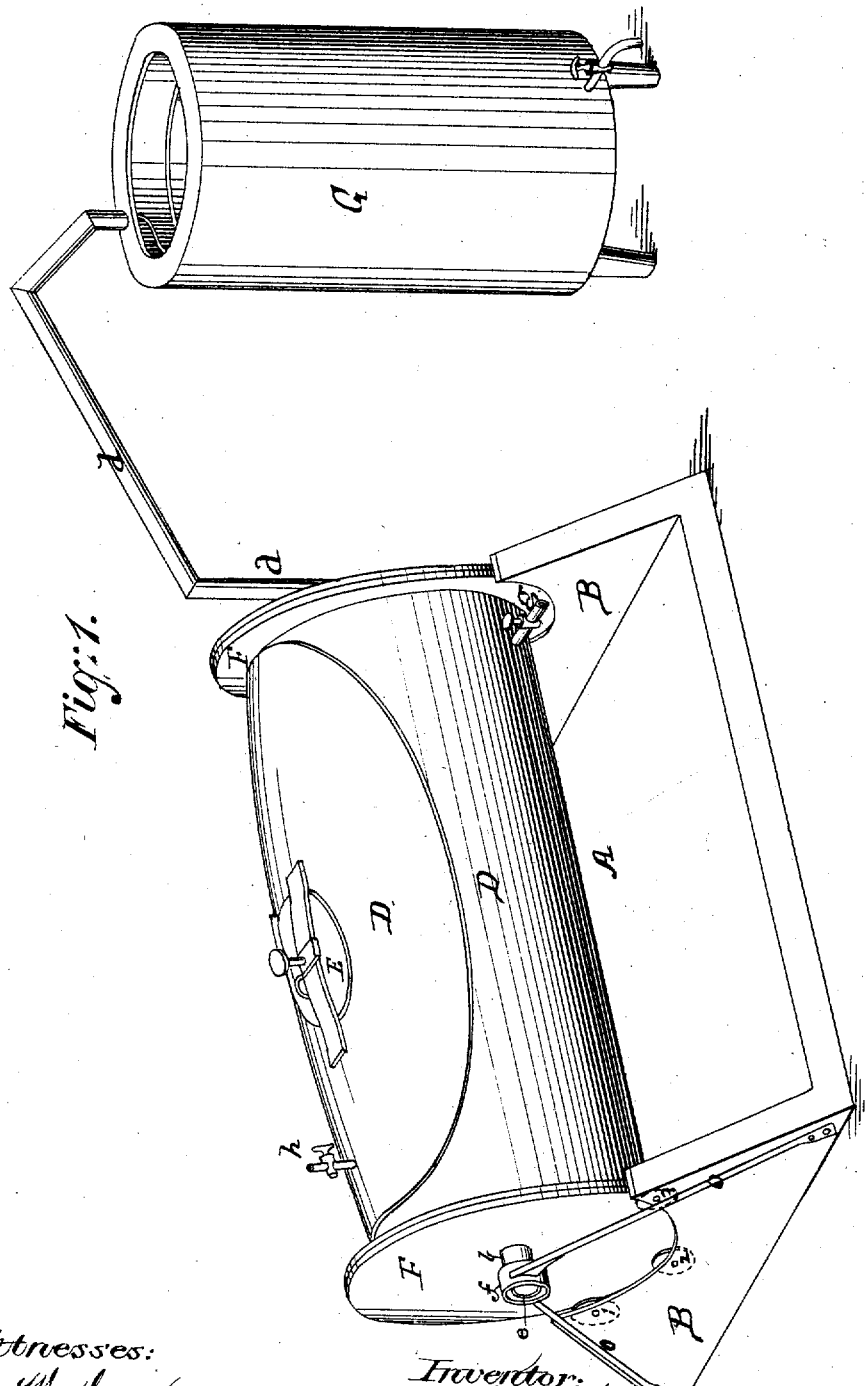
Figure 2:
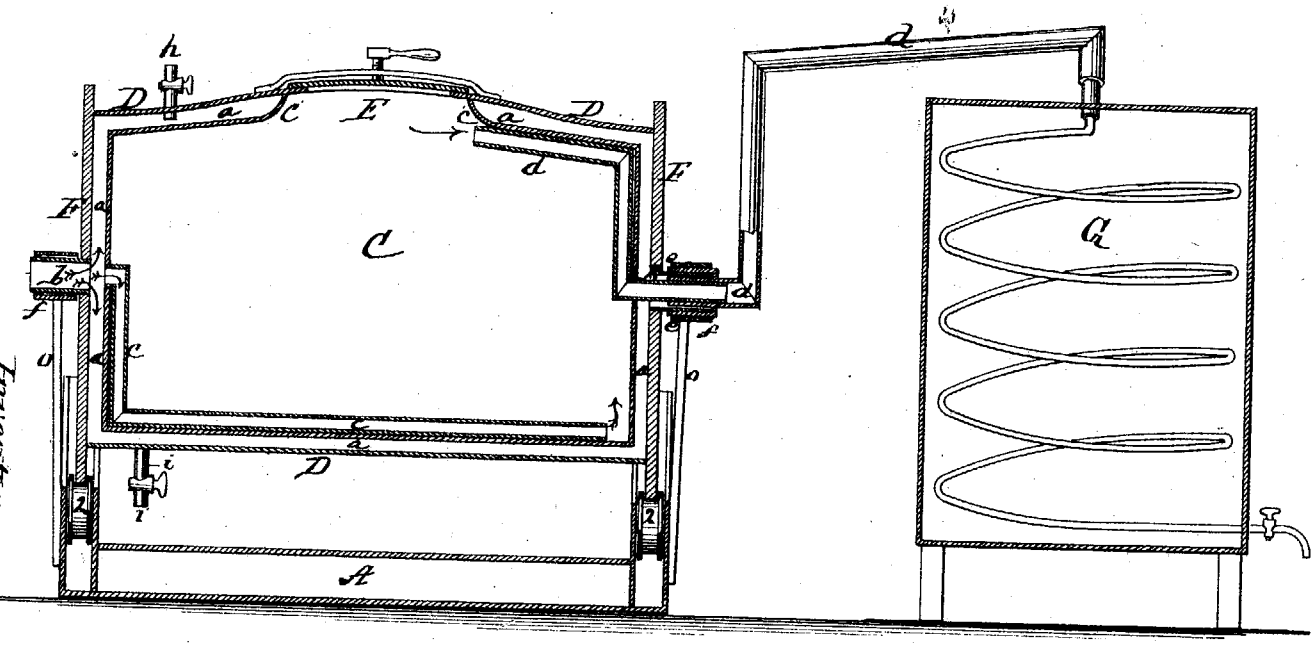
Figure 3:
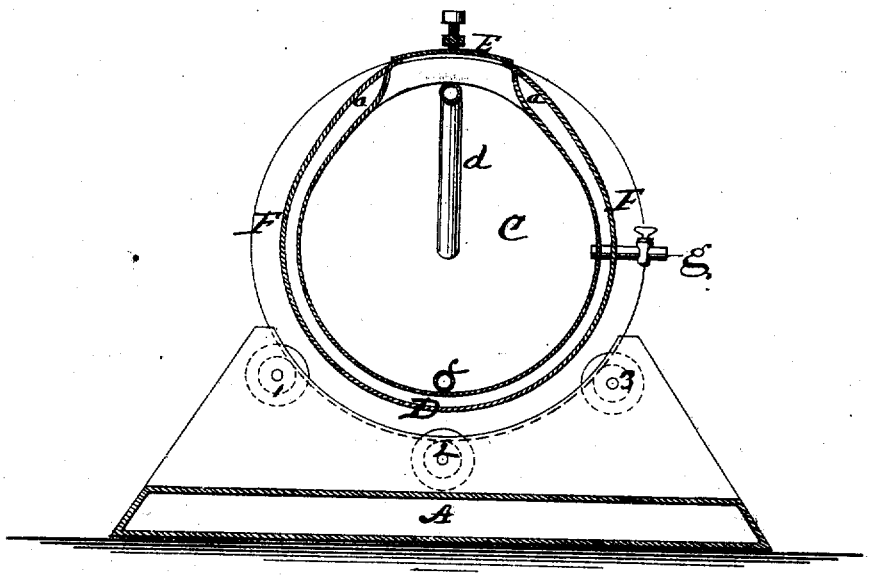

Figure 1 represents a perspective view of the boiler and its support, with an apparatus attached for condensing the vapor and absorbing the foul gases thrown off. Fig. 2 represents a longitudinal vertical section through the apparatus, leaving the connecting-pipe and worm-pipe of the condenser in full. Fig. 3 represents a transverse vertical section through the boiler and its supporting-bed.

Similar letters of reference, where they occur in the several figures, denote like parts of the apparatus in all of them.

My invention consists, first, of a steam-tight, double-walled rendering apparatus, fitted with the necessary openings to charge it with fat, and to discharge the scrap, and pipes to draw off the rendered fat, and into which lard or tallow, or other animal matter, can be rendered or otherwise treated by steam, either directly or indirectly, either by throwing the steam directly in the tank on the matter to be treated, by which the water on the fat will be increased, and by which a wet steam-scrap will be made, or by introducing the steam in the space or chamber between the walls of the tank, by which the water in the tank can be driven off for the most part, leaving the scrap and tallow comparatively dry; second, of a steam-tight apparatus, horizontally placed, adapted to render lard or tallow or other animal matter susceptible of turning about its own axis, and constructed to empty its entire contents at the man-hole when turned to bring the man-hole down for that purpose; third, of a steam-tight rendering apparatus, supplied with a pipe and condenser, by which the escaping vapors can be condensed, and the escaping gases absorbed in the water, and the offensive smell developed in the process avoided.

To enable others skilled in the arts to make and use my invention, I will proceed to describe the same with reference to the drawings.

A represents a metallic or other bed, at each end of which are pillow-blocks B B, the tops of which are rounded out to suit the perimeter of the boiler or boiler-heads that are to turn thereon. In these pillow-blocks B B are arranged double-flanged friction-rollers 1 2 3, set in the circumference of a circle corresponding to that of the boiler-heads. The boiler or tank C is cylindrical, but having that part of it, C′, through which the opening from the exterior is made slightly swelled out or flaring to cause the oils or fats to run out when the said boiler is turned over, substantially as shown by the drawing. The boiler is really one vessel, constructed with a double shell or wall, arranged to leave a narrow space or heating-chamber between the two shells, which must manifestly be united or tied together by means of stay-bolts or rivets, in the usual way of staying boiler-plates around the ash-pit or furnace of a steam-boiler to resist the pressure between the two shells. This space between the two shells of the tank embraces the entire inside surface of the outside shell, and the entire outside surface of the inside shell, excepting that part of both shells occupied by the man-holes, the stays, and openings that pierce the two shells, the pipes, trunnions, cocks, &c.; and there may be more than one man-hole, in case of need, to charge or discharge the tank; and the tank may be stationary instead of movable, in case it be desired, as will be apparent to any one skilled in this branch of the arts.

The cylinder-heads F of the jacket or outer cylinder-shell D are made strong, and project from two to six inches from the inner shell. These cylinder-heads rest on the friction-rollers 1 2 3 in the pillow-blocks B B, which allows the boiler to be readily turned over for emptying it of its contents. There are hollow journals *b b* affixed to each of the cylinder-heads F; but the boiler is not supported upon these journals. Its weight rests upon the friction-rollers 1 2 3. The journals are hollow for the purpose of admitting steam, not only into the steamway *a* between the tank and jacket, but also, if so preferred, to the pipe *c*, which leads into the tank, and thus furnishes steam in direct contact with the material being boiled, the steam-pipe *c* being open at its inner end for this purpose. The arrows in Fig. 2 show how the steam enters.

The gas and vapor which rise from the boiling mass rise to the upper part of the boiler, and are carried off by the pipe *d*, as shown by the arrow in Fig. 2, through one of the hollow journals *b*, and thence to a condenser, G, where the vapor is condensed, and thus all the foul smell arising from the boiling of animal fats is avoided.

It must be observed that the condenser here shown is what is known among engineers as a "surface-condenser," such as is ordinarily applied to stills—that is, the vapor to be condensed is contained in the pipes to the outside of which the condensing-water is applied. It will be apparent, therefore, that only the vapor will be condensed; here leaving the gas to escape through the pipe in the water to which it leads, and by which the gas will be absorbed, though not condensed, in the same sense the vapor is condensed. It will be apparent, too, that by first passing the gases and vapors through the surface-condenser, the vapor or water can be separated from the gas, and, if any grease be carried over, it will run out of the pipe in the form of oil, so that it may be caught in a separate vessel, out of which the gas can escape through the pipe to the water. It will also be apparent that, if no condensing-water be supplied to the vessel containing the coil, the steam and gas will blow directly through the coil to the water, where the vapor will not only be condensed, but the gas will also be absorbed, and the smell avoided, the same as before; but the precaution to catch any grease that may be carried over will be omitted, though the object of this part of the invention will be attained.

The object in making the length of the cylinder horizontally greater than its height is to keep its top low down, and thus save the elevating of the material to the top of a high boiler; secondly, it rests and turns more readily upon its bearings.

The advantage of swelling out that portion of the boiler about the man-hole is that, when the boiler is turned over to be emptied, all its contents will run out, as that part is the lowest when turned over.

The parts *e e*, where the steam enters and the vapors pass out, are made tight by packing in the usual way, while a steam-joint is preserved, so that the boiler may be turned without twisting the pipes that lead into and out of it, said pipes being supported in stationary bosses or sleeves *f*, supported by the braces *o o*.

The water of condensation between the boiler and jacket may be drawn off by a cock, *i*, Fig. 2, and the steam may be let off by a cock, *h*, and a third one, *g*, may be so arranged as to draw off the fat or oil from the interior of the tank without opening the manhole for that purpose, and this cock may be placed at or about the center of the tank. When the tank is used without the jacket, the cocks are arranged accordingly.

The pipes are, of course, to be fitted with cocks in the usual way where it may be necessary to carry out the plan of the invention, and they may be arranged anywhere on the tank or apparatus to suit the will of the operator, and to carry out the purpose of the invention.

The advantages of the invention will be apparent to any one skilled in the arts. The ready means by which the contents of the tank can be emptied, the capability of the apparatus to treat the material either by surface-heat or by injecting the steam directly in the tank on the material under treatment, in a closed vessel, and the various uses to which the apparatus can be put, are among the advantages of the invention, and so, also, are the condensation of the vapors, and the absorption of the gases developed in the process, as well as others which it is not necessary to mention, as they grow out of the principle of the invention itself.

I claim, therefore, as my invention, and desire to secure by Letters Patent—

1. An apparatus to render or treat animal matter, consisting of a tight tank having a hollow wall, formed of two shells united together, provided with the necessary openings, fitted with the usual mountings to close them with a tight joint, substantially as described.

2. A steam-tight rendering-tank, horizontally placed, fitted with trunnions, and provided with a bilge on one side thereof, in which is situated a man-hole, through which to discharge the contents of the tank, substantially as described.

3. A closed tank or kettle, to render or treat animal matter, fitted with a pipe leading from or near the top thereof, to control and condense the escaping vapors and gases developed in the process, for the purpose of avoiding their offensive odor.

4. The hollow-walled tank or boiler C, provided with the steam-pipe *c*, leading from the steam-jacket *a* to the interior of the tank, as and for the purpose set forth.

JOHN L. ALBERGER.

Witnesses:
F. M. INGLEHART,
GEO. S. WILSON.